Dec. 11, 1945. J. H. HOLSTEIN Re. 22,703

SELF-LOADING DEVICE FOR SHAKER CONVEYERS

Original Filed Dec. 8, 1941 3 Sheets-Sheet 1

INVENTOR.
John H. Holstein
BY
Clarence F. Poole
ATTORNEY

Dec. 11, 1945. J. H. HOLSTEIN Re. 22,703
SELF-LOADING DEVICE FOR SHAKER CONVEYERS
Original Filed Dec. 8, 1941 3 Sheets-Sheet 2
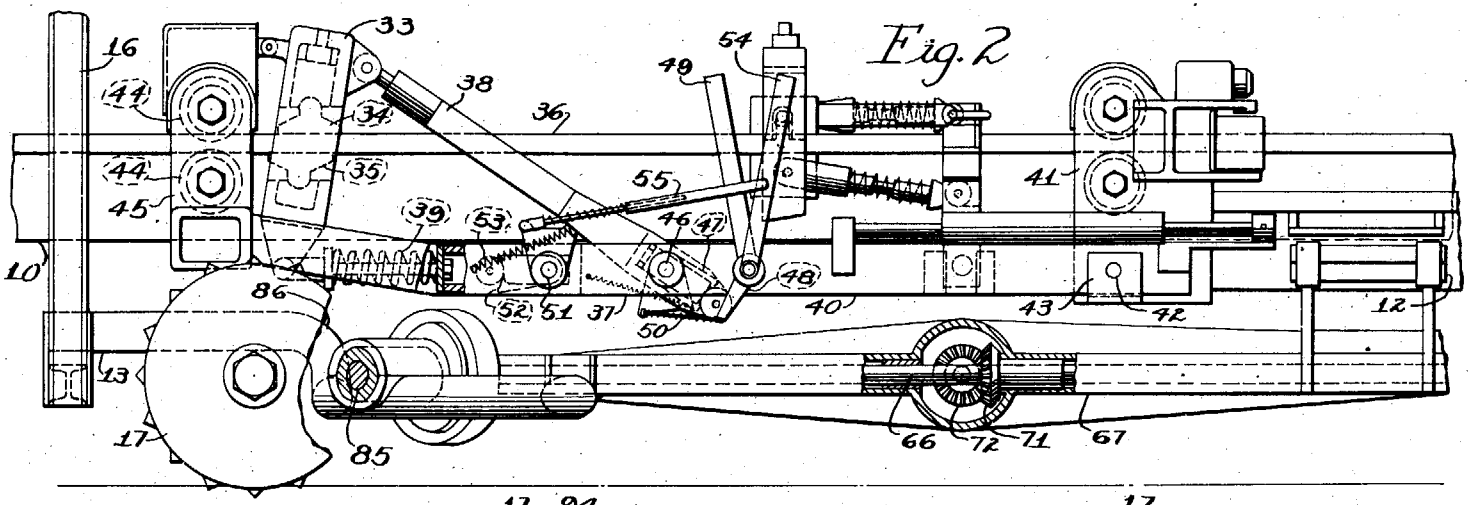
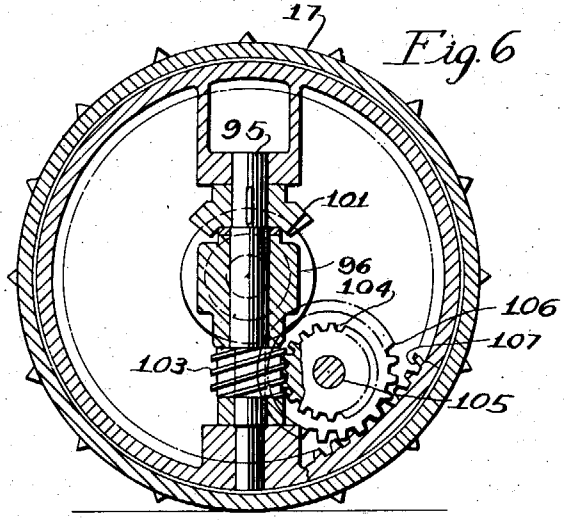
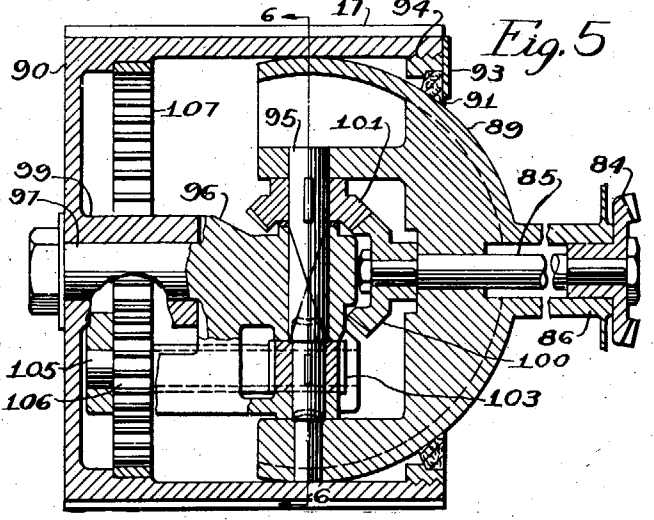
INVENTOR.
John H. Holstein
BY
Clarence A. Poole
ATTORNEY Dec. 11, 1945. J. H. HOLSTEIN Re. 22,703

SELF-LOADING DEVICE FOR SHAKER CONVEYERS

Original Filed Dec. 8, 1941 3 Sheets-Sheet 3

INVENTOR.
John H. Holstein
BY
Clarence J. Poole
ATTORNEY

Reissued Dec. 11, 1945

Re. 22,703

UNITED STATES PATENT OFFICE 22,703

SELF-LOADING DEVICE FOR SHAKER CONVEYERS

John H. Holstein, Baltimore, Md., assignor to Goodman Manufacturing Company, Chicago, Ill., a corporation of Illinois Original No. 2,326,857, dated August 17, 1943, Serial No. 422,059, December 8, 1941. Application for reissue September 21, 1945, Serial No. 617,939

13 Claims. (Cl. 198—14)

This invention relates to improvements in self-loading devices for shaker conveyers of the type utilized for picking up loose material such as coal, rock, or the like from the ground.

The principal objects of my invention are to provide a novel and efficient form of self-loading device for shaker conveyers including an improved mechanism for moving said loading device about the mine, and for laterally swinging it from side to side during the loading operation.

A more specific object of my invention is to provide a novel form of power driven traction device arranged to move the loading device in a longitudinal direction and adjustable to swing it from side to side, as desired.

Other objects of my invention will appear from time to time as the following specification proceeds and with reference to the accompanying drawings wherein:

Figure 2 is an enlarged fragmentary view in side elevation, showing certain details of the feeding mechanism and the supporting and swinging means therefor;

Figure 5 is an enlarged fragmentary transverse sectional view taken through one of the traction wheels;

Figure 7:
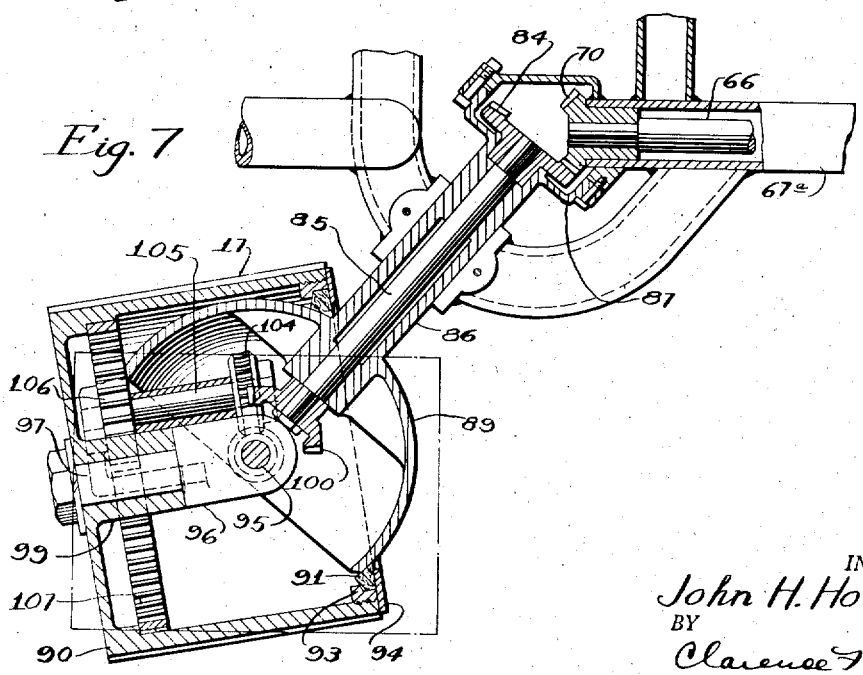

Figure 6 is a fragmentary sectional view taken substantially along line 6—6 of Figure 5; and Figure 7 is a plan view drawn to a slightly smaller scale than Figures 5 and 6, with parts shown in horizontal section in order to show certain details of the drive to the traction wheels, not shown in Figures 5 and 6.

In the drawings, the embodiment of my invention illustrated includes generally a pick-up member or extensible trough section 10 having a shovel 11 on the forward end thereof, for picking up loose material from the ground. Said extensible trough section is mounted for extensible or retractible movement with respect to a reciprocating trough section 12 and said reciprocating and extensible trough sections are reciprocably supported and guided in an elongated frame 13, connected at its rear end to a base 14, for transverse movement about said base. Said base is herein shown as being mounted on wheels, for movement about the mine, but is adapted to be held in fixed relation with respect to the ground by suitable jacks, or the like, during the loading operation.

The elongated frame 13, as herein shown, extends along opposite sides of the reciprocating trough section 12 and the extensible trough section 10. Said frame is provided with laterally spaced upright bearing members 16, 16 at its forward end, having bearing engagement with opposite sides of said extensible trough section, for laterally swinging said extensible trough section upon lateral swinging movement of said frame. Said frame is mounted, adjacent its forward end, for transverse movement along the ground, on a pair of laterally spaced traction devices 17, 17, herein shown as being traction wheels adjustably mounted to move said frame in a longitudinal direction, or to swing said frame from side to side. The support and drive to said traction wheels will be more fully described as this specification proceeds.

The connection from the rear end of said frame to said base is somewhat similar to that disclosed in Patent No. 2,280,043, issued to Loy D. Hagenbook on December 24, 1940, so will only herein be described insofar as is necessary to make my present invention readily understandable. Said connection includes a connecting member 19, herein shown as being pivotally connected to said base for movement about a transverse axis. Said connecting member is provided with a longitudinally extending slot 20 and a transversely extending slot 21. Blocks 22 and 23 have vertical pivotal connection with a plate 24. Said plate is secured to and projects rearwardly from the rear end of said frame, and said blocks have guiding engagement with said slots, to guide said frame for movement about a pair of longitudinally spaced parallel vertical axes. Said axes, as herein shown, are the axis of connection of an intermediate connecting trough section 25 to a drive trough section 26, and the axis of connection of said intermediate trough section to the reciprocating trough section 12.

Figure 4:
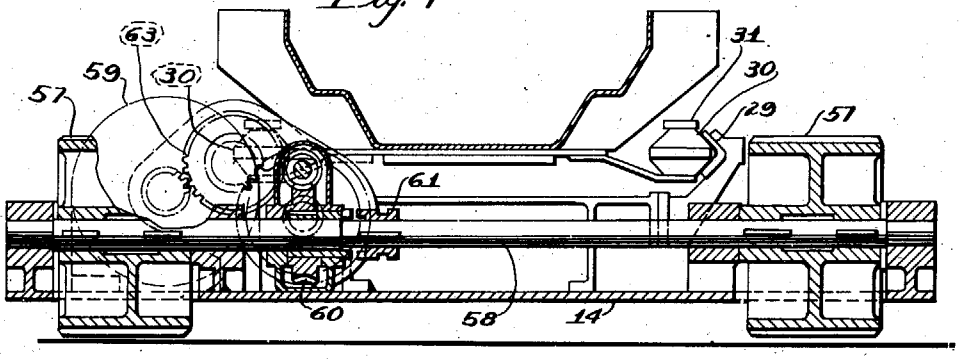
Figure 4 is a transverse sectional view taken substantially along line 4—4 of Figure 1.

The trough section 26 may be attached to the forward end of a shaker conveyer pan line (not shown), or may be reciprocably driven from a suitable independent drive mechanism mounted on the base 14. As herein shown, said trough section is connected to the forward end of a shaker conveyer pan line and is mounted on said base at its forward end, for reciprocable movement with respect thereto. The support for said trough section on said base includes a pair of laterally spaced, inwardly facing, V-shaped guide tracks 29, 29, which engage substantially V-shaped faces of rollers 30, 30. Said rollers are mounted on bracket members 31, 31, extending laterally from opposite sides of said trough section, and are rotatable about vertical axes (see Figure 4). In a like manner, the forward end of the intermediate connecting trough section is reciprocably mounted on the frame 13 by means of suitable rollers (not shown) engaging inwardly facing, parallel guide tracks 32, 32, mounted on said frame.

The means for extending the extensible trough section with respect to the reciprocating trough section is substantially the same as that shown and described in Patent No. 2,303,792, issued to Loy D. Hagenbook on April 24, 1941, so will not herein be described in detail. Said extending means includes a pair of carrier members 33, 33, having friction grip blocks 34 and 35 pivotally mounted therein and adapted to engage the upper and lower sides of bearing plates 36, 36, projecting laterally from and extending along the upper edges of said extensible trough section. Said carrier members are connected with a floating frame 37 by means of links 38 and 39, which floating frame is reciprocated with the reciprocating trough section 12.

The floating frame 37 includes a pair of side frame members 40, 40 which are pivotally connected at their rear ends to opposite sides of a U-frame 41, secured to and extending across the bottom of and upwardly along opposite sides of the forward portion of the reciprocating trough section 12. The connection between said side frame members includes pivotal pins 42, 42 extending through brackets 43, 43, formed on opposite sides of said U-frame.

The forward end of said floating frame is slidably supported on the bearing plates 36, 36 by means of two pairs of parallel spaced flanged rollers 44, 44, mounted in opposite sides of a U-shaped forward end portion 45 of said floating frame and engaging the upper and lower sides of the bearing plates 36, 36.

The links 38, 38 extend in a downwardly and rearwardly inclined direction from the upper ends of the carrier members 33, 33 and are slidably mounted on a transverse shaft 46. Said shaft is journaled in opposite sides 40, 40 of the frame 37. Cam members 47, 47 are mounted on said shaft and are engageable with rollers 48, 48 mounted on said links for holding said links from slidable movement with respect to said shaft, to cause said links to exert a pulling force on the upper ends of said carrier members in a direction to engage the grip blocks 34 and 35 with the bearing plates 36, 36 upon the return strokes of the conveyer, and to exert a force on said carrier members in a direction to disengage said grip blocks from said bearing plates during the forward strokes of the conveyer. Said cams are engaged with or disengaged from said rollers by means of a hand lever 49 and a yieldable link 50.

The links 39, 39 are of a yieldable construction to cause the grip blocks 34 and 35 to release from the bearing plates 36, 36 upon the forward strokes of the conveyer, when said extensible trough section engages an obstruction and said links are extending said extensible trough section. Said links are mounted for slidable movement with respect to a transverse shaft 51, journaled in opposite sides of the frame 37. Laterally spaced cam members 52, 52 are mounted on said shaft and are engageable with rollers 53, 53 mounted on said links, for holding said links from slidable movement with respect to said shaft, to cause said links to engage the grip blocks 34 and 35 with the bearing plates 36, 36 upon the forward strokes of the conveyer. Said cams are engaged with or disengaged from said rollers by means of a hand lever 54 and a yieldable link 55.

The base 14, as herein shown, is mounted at its forward end on a pair of wheels 56, 56, which are freely rotatable about coaxial transverse axes, and is mounted at its rear end on a pair of laterally spaced power driven wheels 57, 57, which are keyed to a transverse shaft 58. Said shaft is journaled in said base and is selectively driven from a motor 59, on said base, by means of a worm and worm gear drive generally indicated by reference character 60, and a suitable clutch 61, herein shown as being a jaw clutch. The worm of said worm and worm gear drive is driven from the rear end of a longitudinally extending shaft 62, which shaft in turn is driven from said motor by a reduction gear train generally indicated by reference character 63. Said base may thus be moved by power in a longitudinal direction, reversal in the direction of movement of said base being effected by reversal in the direction of rotation of the motor 59.

Figure 1:
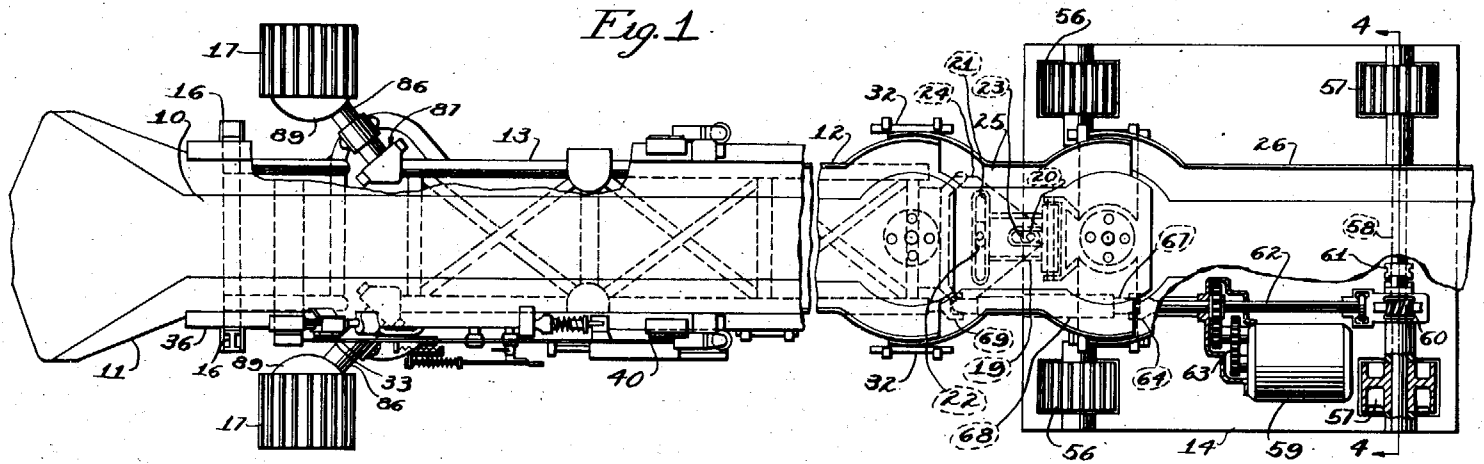
Figure 1 is a top plan view of a loading device constructed in accordance with my invention, with certain parts broken away and certain other parts shown in section.

The drive to the traction wheels 17, 17 includes a universal coupling 64, keyed to the forward end of the shaft 62. Said universal coupling has driving connection with a longitudinally extending shaft 66, by means of a shaft 67, a sleeve 68, slidably engaging said shaft, and a universal coupling 69 (see Figure 1). Said longitudinally extending shaft 66 is journaled in a tubular side frame member **67*a* of the frame 13** and extends therethrough.

Figure 3:
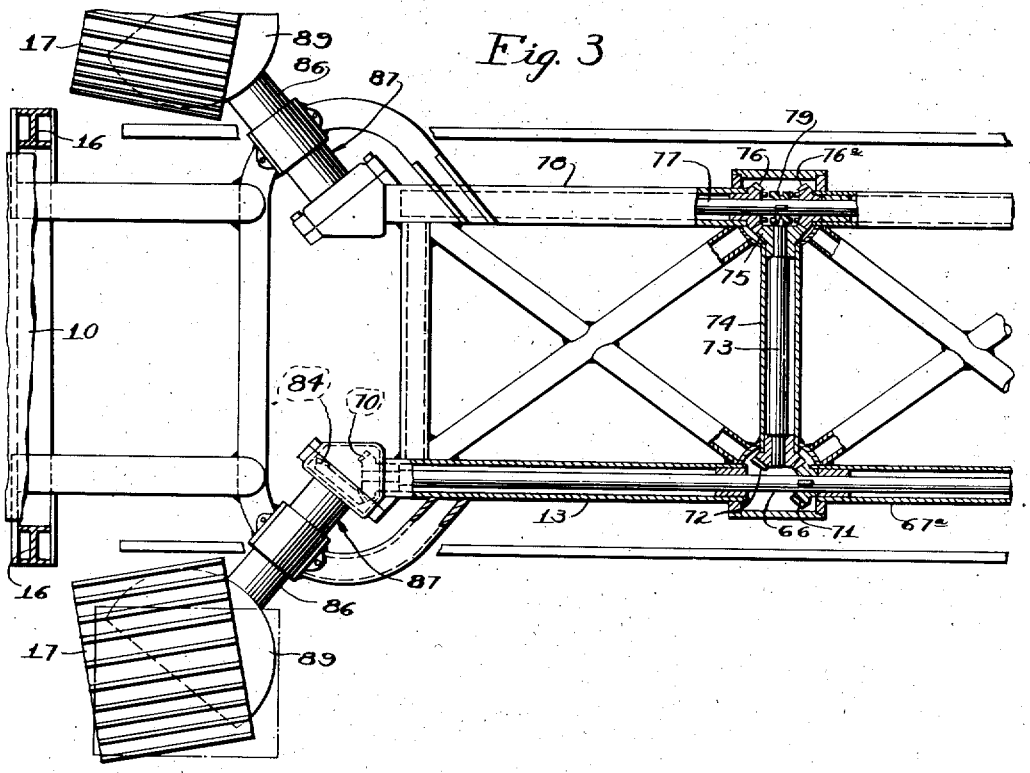
Figure 3 is a partial fragmentary plan view, with the conveyer troughs removed, showing certain details of the swinging mechanism for the conveyer.

A bevel gear 70 is keyed on the forward end of the longitudinally extending shaft 66 and serves to drive one traction wheel 17 (see Figure 7). The other traction wheel 17 is driven from a bevel gear 71, keyed on the shaft 66 intermediate its ends (see Figure 3). Said bevel gear meshes with and drives a bevel gear 72 on a transverse shaft 73. Said transverse shaft is journaled in a cross member 74 of said frame on the hub of the bevel gear 72 and the hub of a bevel gear 75, keyed on the end of the shaft 73, opposite from the bevel gear 72. Said last mentioned bevel gear meshes with and drives bevel gears 76 and **76*a* freely mounted on a longitudinally extending shaft 77, which is journaled within a side frame member 78 of the elongated frame 13, opposite from the side frame member 67*a***.

A suitable clutch, such as a jaw clutch 79, is provided to selectively connect either of the bevel gears 76 or **76*a* to the shaft 77, for selectively driving said shaft in reverse directions. Said clutch may be operated by a suitable system of levers of any well known type (not shown), for connecting the bevel gear 76 with the shaft 77 and driving the right-hand traction wheel 17 in the same direction as the left-hand traction wheel when said traction wheels are positioned to extend longitudinally of the loading mechanism, and for disconnecting said gear from said shaft and connecting the gear 76*a*** with said shaft for reversing the direction of rotation of said shaft and driving the right-hand traction wheel in the same direction as the left-hand traction wheel, when said wheels are positioned to swing the loading mechanism laterally with respect to the working face.

The drive from the forward end of the shaft 77 to the right-hand traction wheel 17 is the same as the drive from the forward end of the shaft 66 to the left-hand traction wheel, so the drive to the left-hand traction device only will herein be described.

The bevel gear 70 meshes with and drives a bevel gear 84 on the inner end of a shaft 85, journaled in a tubular portion 86 of a housing 87. Said last mentioned shaft and tubular portion are mounted in the frame 13 and extend angularly forwardly and outwardly from the shaft 66. The housing 87 is secured to the frame 13 and is provided with an enlarged forwardly projecting portion 89 of a semi-spherical formation, which semi-spherical portion forms a support and mounting for a traction wheel 17.

The traction wheel 17 is of a drum-like construction with a closed outer end 90 (see Figure 7). Said traction device encircles the outer portion of the spherical forward portion of the housing 87 and is provided with a packing member 91 at its inner end, which is of an annular formation and which has wiping engagement with the periphery of said spherical supporting portion, to keep dirt from the inside of said traction wheel. Said packing member is mounted in a ring 93, threaded within the inner end of said traction wheel, and is retained in said ring by means of an annular member 94, secured to the inner end of said traction wheel.

The mounting for the traction wheel 17 on the forward spherical portion 89 of the housing 87 includes a vertical shaft 95, journaled within said semi-spherical portion of said housing and having an axle support 96 journaled thereon, intermediate the ends of said shaft (see Figures 5 and 6). Said support as herein shown has an integrally formed stud 97, projecting outwardly therefrom, which is journaled within a boss 99, projecting inwardly from the closed outer end 90 of said traction wheel, and which forms an axle for said traction wheel. Said traction wheel may thus pivotally move with respect to said housing about a vertical axis, to move the elongated frame 13 and the extensible and reciprocating trough sections 10 and 12 either in a longitudinal direction or transversely with respect to the base 14. Said traction wheels, as herein shown, are pivotally moved about a vertical axis by hand, but suitable steering mechanism of any well known construction may be provided for turning said traction wheels, if desired.

The drive from the shaft 85 to the left-hand traction wheel 17 includes a bevel gear 100 keyed on the forward end of said shaft and meshing with a bevel gear 101 keyed on the vertical shaft 95, just above the axle support 96 (see Figure 5). A worm 103 is keyed on and driven from said shaft and is disposed in an open portion of said axle support, adjacent the lower end thereof, and meshes with and drives a worm gear 104, suitably journaled in said axle support. Said worm gear is mounted on a shaft 105, which is journaled within said axle support and serves to drive said shaft. A spur gear 106 is keyed on the outer end of said shaft and meshes with an internal gear 107, secured to the inner periphery of said traction wheel, for driving said traction wheel.

It may be seen from the foregoing that when it is desired to move the entire loading mechanism about the mine or into the working place, that the traction wheels 17, 17 may be positioned for rotation about transverse axes and that said traction wheels together with the traction wheels 57, 57 may move the loading apparatus in a longitudinal direction. The direction of movement of said loading device may be reversed, by reversing the direction of rotation of the motor 59. When it is desired to swing the extensible trough section 10 and shovel 11 laterally, the traction wheels 17, 17 are pivoted about the axis of the vertical shafts 95, 95, by hand, until they are transversely positioned with respect to said trough section, and the direction of rotation of the shaft 77 is reversed by the clutch 79, so both wheels will rotate in the same direction. Power is then applied to said traction wheels through the motor 59 and shaft 66, and reversal in swinging movement of said extensible trough section is effected by reversing the direction of rotation of said motor.

Since a greater part of the reduction gearing, for driving the traction wheels 17, 17 from the shaft 66 is within the limits of said traction wheels; since the reactions in a horizontal direction, which would tend to pivot said traction wheels in one direction or another about their vertical axes, are substantially balanced; and since the frame 13 moves in a controlled path about the base 14, an extraneous holding or steering means for said traction wheels is not necessary although such a holding or steering means may be provided, if desired.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a self-loading device for shaker conveyers, a reciprocating trough section, an extensible trough section having a gathering shovel on the forward end thereof, mounted for extensible movement with respect to said reciprocating trough section, and a power driven traction device supporting the forward end of said reciprocating trough section above the ground and adapted to move said reciprocating and extensible trough sections in a lateral or a longitudinal direction, said traction device being adjustably movable about a vertical axis and being driven by power when in various positions of adjustment about said vertical axis.

2. In a self-loading device for shaker conveyers, a base, a shaker conveyer trough section mounted on said base for reciprocable movement with respect thereto, a frame projecting from said base and having connection therewith, for lateral swinging movement with respect thereto, an extensible shovel mounted on the forward end of said frame, for picking up material from the ground, and a pair of power driven traction devices at the forward end of said frame, for supporting the forward end of said frame and for moving said frame laterally about said base or longitudinally with said base, said traction devices being adjustably movable about a pair of parallel spaced vertical axes.

3. In a self-loading device for shaker conveyers, a mobile base, a shaker conveyer trough section mounted on said base, for reciprocable movement with respect thereto, a frame projecting in advance of said base and mounted for lateral movement with respect to said base, a reciprocating trough section reciprocably mounted on said frame, a connection between said reciprocating and shaker conveyer trough sections, to permit material to move from one trough section to the other when said trough sections are in various positions of adjustment with respect to each other, an extensible trough section mounted for extensible and retractible movement with respect to said reciprocating trough section, a pair of traction wheels supporting the forward end of said frame, for moving said frame transversely with respect to said base, said traction wheels being movable for rotation about longitudinal or transversely disposed axes, and being adapted to move said frame and loading head while rotating about said axes, and means for driving said traction devices when adjusted for rotation about longitudinal or transversely disposed axes.

4. In a self-loading device for shaker conveyers, a mobile base, a shaker conveyer trough section mounted on said base, for reciprocable movement with respect thereto, a frame projecting in advance of said base and mounted for lateral movement with respect to said base, a reciprocating trough section reciprocably mounted on said frame, a connection between said reciprocating and shaker conveyer trough sections, to permit material to move from one trough section to the other when said trough sections are in various positions of adjustment with respect to each other, an extensible trough section mounted for extensible and retractible movement with respect to said reciprocating trough section, a pair of traction wheels supporting the forward end of said frame, for moving said frame transversely with respect to said base, said traction wheels being movable for rotation about longitudinal or transversely disposed axes, and being adapted to move said frame and loading head while rotating about said axes, a motor on said base, and means driven from said motor for driving said traction wheels when rotatable about either longitudinal or transverse axes.

5. In a self-loading device for shaker conveyers, a base, traction wheels for supporting said base for movement along the ground, a shaker conveyer trough section mounted on said base, for reciprocable movement with respect thereto, a frame having laterally swingable connection with said base and projecting forwardly therefrom, a reciprocating trough section mounted on said frame, an extensible trough section extensible from or retractible within said reciprocating trough section, traction wheels supporting the forward end of said frame for movement along the ground longitudinally with and transversely with respect to said base, for moving said frame with said base and for swinging said frame and said reciprocating and extensible trough sections laterally with respect to said base, and a motor mounted on said base, for driving said last mentioned traction wheels.

6. In a self-loading device for shaker conveyers, a base, traction wheels for supporting said base for movement along the ground, a shaker conveyer trough section mounted on said base, for reciprocable movement with respect thereto, a frame having laterally swingable connection with said base and projecting forwardly therefrom, a reciprocating and an extensible trough section mounted on said frame, said extensible trough section being extensible from or retractible within said reciprocating trough section, traction wheels supporting the forward end of said frame, a motor mounted on said base for driving said first and last mentioned traction wheels, and said last mentioned traction wheels being pivotally adjustable about vertical axes, to permit said traction wheels to move said frame longitudinally or to swing said frame laterally about said base.

7. In a traction device, and in combination with a shaker conveyer including a laterally swingable, elongated frame having a reciprocating and an extensible trough section guided for movement therealong, a pair of traction wheels supporting the forward end of said elongated frame above the ground, said traction wheels being adjustable about vertical axes, and means for supporting each of said traction wheels for horizontal adjustment, including a supporting frame member mounted on said frame and extending within the tread of each wheel and an axle support journaled on said supporting frame member, for rotation about a vertical axis and forming a support for the axle of said traction wheel.

8. In a traction device, and in combination with a shaker conveyer including a laterally swingable elongated frame having a reciprocating and an extensible trough section guided for movement therealong, a pair of traction wheels supporting the forward end of said elongated frame above the ground, said traction wheels being adjustable about vertical axes, and means for supporting each of said traction wheels for horizontal adjustment, including a supporting frame member mounted on said frame and extending within the tread of each wheel and an axle support journaled on said supporting frame member, for rotation about a vertical axis and forming a support for the axle of said traction wheel, and gear reduction means mounted within said wheel and having drive connection with said wheel.

9. In a traction device, and in combination with a shaker conveyer including a laterally swingable elongated frame having a reciprocating and an extensible trough section guided for movement therealong, a pair of traction wheels supporting the forward end of said elongated frame above the ground, said traction wheels being adjustable about vertical axes, means for supporting each of said traction wheels for horizontal adjustment, including a supporting frame member mounted on said frame and having a spherical portion extending within the tread of said wheel, and an axle support mounted within said spherical portion, for adjustment about a vertical axis and having said wheel mounted thereon for rotation about a horizontal axis.

10. In a traction device, and in combination with a shaker conveyer including a laterally swingable elongated frame having a reciprocating and an extensible trough section guided for movement therealong, a pair of traction wheels supporting the forward end of said elongated frame above the ground, said traction wheels being adjustable about vertical axes, means for supporting each of said traction wheels for horizontal adjustment, including a supporting frame member mounted on said frame and having a spherical portion extending within the tread of each wheel, means mounted within said spherical portion, for supporting said wheel for rotation about a horizontal axis and for adjustment about a vertical axis, and means engaging said spherical portion to prevent dirt from entering said wheel in all positions of adjustment with respect thereto.

11. In a traction device, and in combination with a shaker conveyer including a laterally swingable elongated frame having a reciprocating and an extensible trough section guided for movement therealong, a pair of traction wheels supporting the forward end of said elongated frame above the ground, said traction wheels being adjustable about vertical axes, and means for supporting each of said traction wheels for horizontal adjustment, including a supporting frame member mounted on said frame and having a spherical portion extending within the tread of each wheel, means mounted within said spherical portion, for supporting said wheel for rotation about a vertical axis, and gear reduction means mounted within said spherical portion, for driving said wheel.

12. In a traction device, and in combination with a shaker conveyer including a laterally swingable elongated frame having a reciprocating and an extensible trough section guided for movement therealong, a pair of traction wheels supporting the forward end of said elongated frame above the ground, said traction wheels being adjustable about vertical axes, and means for supporting each of said traction wheels for horizontal adjustment, including a supporting frame member mounted on said frame and extending within the tread of each wheel, an axle support journaled on said supporting frame member, for rotation about a vertical axis and forming a support for the axle of said traction wheel, and gear reduction means mounted within said wheel and having drive connection with said wheel including a worm coaxial with the axis of pivotal movement of said axle support, a worm gear journaled in said axle support member and driven thereby, an internal gear on the inner periphery of said wheel, and a geared drive connection between said worm and internal gear.

13. In a self-loading device for shaker conveyers, a base, an elongated frame extending from said base and having connection therewith for lateral swinging movement thereabout, a reciprocating trough section mounted on said frame for reciprocable movement with respect thereto, and an extensible trough section mounted for extensible or retractible movement with respect to said reciprocating trough section, a traction device at the forward end of said frame for supporting said frame and the forward end of said reciprocating trough section above the ground, a mounting for said traction device on said frame to permit adjustment of said traction device for rotation about an axis extending transversely or longitudinally of the conveyer, for moving said frame in a lateral or a longitudinal direction, and a power drive connection to said traction device for driving said traction device when in various positions of adjustment.

JOHN H. HOLSTEIN.